(12) United States Patent
Barnwell

(10) Patent No.: US 7,721,787 B2
(45) Date of Patent: May 25, 2010

(54) REFRIGERATION-TYPE DRYER APPARATUS AND METHOD

(75) Inventor: James W. Barnwell, Ocala, FL (US)

(73) Assignee: Flair Corporation, Ocala, FL (US)

( * ) Notice: Subject to any disclaimer, the term of this patent is extended or adjusted under 35 U.S.C. 154(b) by 310 days.

(21) Appl. No.: 11/598,042

(22) Filed: Nov. 13, 2006

(65) Prior Publication Data

US 2007/0056308 A1    Mar. 15, 2007

(51) Int. Cl.
*F28D 19/00*    (2006.01)

(52) U.S. Cl. .................. 165/11.1; 165/10; 165/140; 165/104.14; 62/93; 62/406

(58) Field of Classification Search ............... 165/11.1, 165/10, 48.1, 59, 61, 63, 104.11, 104.14, 165/104.34, 140; 62/93, 272, 332, 406, 430, 62/431, 432, 434, 435, 436, 437, 438, 439
See application file for complete search history.

(56) References Cited

U.S. PATENT DOCUMENTS

| 4,116,651 | A  | 9/1978 | Rickert | ........................ 62/59 |
|---|---|---|---|---|
| 5,228,504 | A  | 7/1993 | Mantegazza et al. | ........ 165/111 |
| 5,944,089 | A  | 8/1999 | Roland | ........................ 165/10 |
| 6,085,529 | A  | 7/2000 | Galus et al. | .................... 62/93 |
| 6,393,861 | B1 | 5/2002 | Levenduski et al. | ........... 62/434 |
| 6,606,877 | B2 | 8/2003 | Tomita et al. | ................. 62/244 |
| 6,708,512 | B2 | 3/2004 | Kitamura et al. | .............. 62/227 |

*Primary Examiner*—Ljiljana (Lil) V Ciric
(74) *Attorney, Agent, or Firm*—Baker & Hostetler LLP

(57) ABSTRACT

A drying device includes an air/air heat exchanger and an air/refrigerant heat exchanger. The air refrigerant heat exchanger includes a phase change material.

13 Claims, 4 Drawing Sheets

REFRIGERATION-TYPE DRYER APPARATUS AND METHOD

FIELD OF THE INVENTION

The present invention relates generally to drying systems. More particularly, the present invention is directed to a refrigeration-type air dryer comprising a heat storage medium phase change material.

BACKGROUND OF THE INVENTION

Air dryers are generally utilized to remove water vapor typically from compressed air or gas. Where refrigerant-type air dryers are employed, a refrigerant system is used to lower the temperature of the air or gas being dried to a temperature at or below the condensation temperature of water therein. At such temperatures, water vapor in the undried air condenses on a surface within a condenser where it can be collected and purged from the system.

In order to sufficiently lower the temperature of the undried air or gas, many refrigerant systems comprise a heat exchanger where heat is drawn from the air or gas being dried to a refrigerant. Typically, heat from undried air is coupled to the evaporation of a colder refrigerant in an evaporator. In this case, as the liquid refrigerant is vaporized, it removes heat from the undried air or gas and cools the air in the process. When the air or gas reaches a temperature at or below the condensation temperature of water therein, the net result is that the water vapor therein begins to condense (or separate) from the air or gas and is collected in a condenser or separator.

In order to recycle the refrigerant in the system, a compressor and a chiller unit are often installed—the compressor compresses the gaseous refrigerant that has been vaporized in the chiller, and the condenser condenses the gaseous refrigerant into a high pressure liquid. The refrigerant, is then ready for another cycle of vaporization.

A common problem with refrigeration-type dryers is determining how to suspend cooling (i.e., "de-energize" the system) during times of no load or low load conditions. For example, the demand for refrigeration is low or non-existent when little to no air is flowing through the refrigerator dryer or when the incoming air is already cool. Typically, it is desirable to reduce or discontinue cooling during such periods to avoid ice formation in the refrigerant system that could affect operation of the refrigeration air dryer. Ice can plug the system so that it does not continue drying the air, or it can plug the air passages stopping the flow of compressed air.

One way to prevent excessive cooling and the resulting problem, is to use a cycling-type refrigeration dryer. In a cycling refrigeration-type dryer system, a thermostatic temperature device causes de-energizing of a refrigerant compressor when the undried air has been cooled to a predetermined temperature. This can also be accomplished by measuring the evaporator pressure. The same device can then cause the compressor to be re-energized when the temperature in the evaporator elevates to a predetermined temperature, indicating further cooling is required to remove moisture from the incoming air. Thus, it has been found that between adequate load and low load conditions, a refrigeration compressor may cycle on and off about thirty to forty times per hour.

The number of cycles per hour is significant because frequent cycling adds costs associated with wear and tear on the compressor, control systems, and valves. As a result, the life without maintenance of the refrigeration system is drastically reduced. Accordingly, it would be desirable to provide a refrigerant air dryer system and method that extends the life of its refrigeration system.

Moreover, the greater the number of times a refrigeration system cycles, the greater the amount of energy that is consumed. Lower energy consumption has both cost and environmental benefits. Accordingly it would also be desirable to provide a refrigeration dryer system and method that reduces the amount of energy consumed.

SUMMARY OF THE INVENTION

The foregoing needs are met, to an extent, by the present invention, wherein in one embodiment an air drying apparatus is provided that comprises a refrigerant system and a heat exchanger further comprising a phase change material, wherein the refrigerant system is adapted for cooling the heat exchanger. The air dryer may dry air or gas which may optionally be compressed air or gas. In some embodiments, air dryers of the present invention may comprise a condensate separator, preferably including a wire mesh. The phase change material can change between solid and liquid phases. In some embodiments the phase change material is an organic paraffin.

In other embodiments, a method of drying air is provided which comprises providing a refrigerant system and a heat exchanger comprising a phase change material and using the refrigerant system to cool the heat exchanger. The method may be used to dry air or gas which may optionally be compressed air or gas. In some embodiments, method of air drying of the present invention may comprise a condensate separator, preferably including a wire mesh. The phase change material can change between solid and liquid phases. In some embodiments the phase change material is an organic paraffin.

In yet other embodiments, a means for drying air is provided, comprising a refrigeration means and a heat exchanger means comprising a phase change material, wherein the refrigeration means is adapted for cooling the heat exchanger means. The air drying means may dry air or gas which may optionally be compressed air or gas. In some embodiments, air dryer means of the present invention may comprise a condensate separator means, preferably including a wire mesh. The phase change material can change between solid and liquid phases. In some embodiments the phase change material is an organic paraffin.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
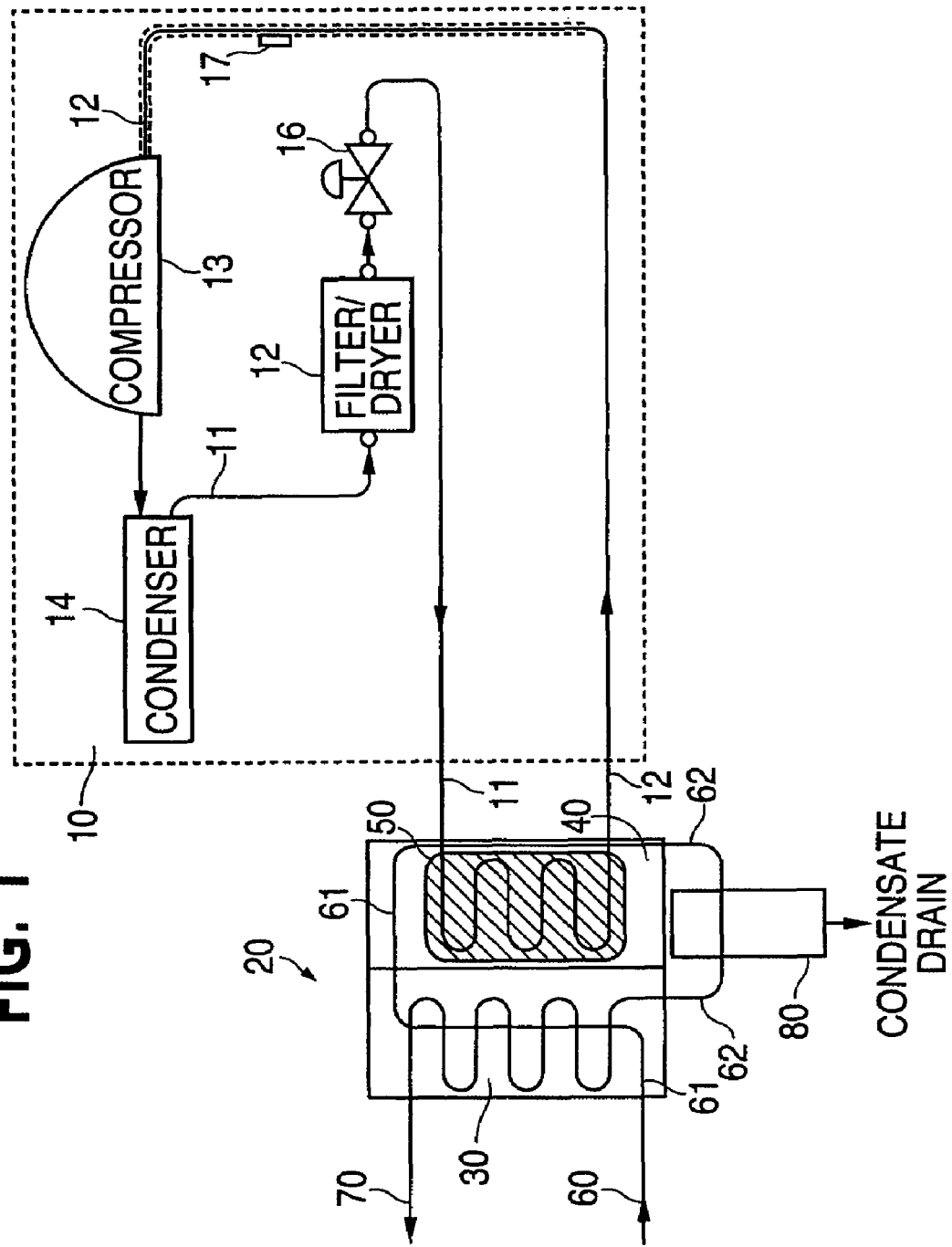
FIG. 1 is a cut-away of an evaporator of a refrigerated air dryer in accordance with the present invention.

The invention will now be described with reference to the drawing figures, in which like reference numerals refer to like parts throughout. An embodiment in accordance with the present invention provides a refrigeration system 10 operationally coupled to a heat exchanger 20 to cool undried compressed air to a temperature sufficient to separate and remove any water therein by virtue of its condensation at such sufficient temperature. The heat exchanger 20 may be of multiple embodiments, some of which will be described below. In the schematic shown in FIG. 1, the heat exchanger 20 comprises an air-to-air ("air/air") exchanger 30 and an air-to-refrigerant ("air/refrigerant") exchanger 40. The exchanger 40 further comprises a thermal jacket 50, which in the embodiment shown, is directly cooled by the refrigerant system 10. The exchanger 30 is shown with co-current flow in FIG. 1, but in some embodiments can also comprise counter-current flow.

Broadly speaking, air, gas, including compressed air and gas, or generally, any vapor in need of drying, is injected into the heat exchanger 20 through an inlet 60. The term "air" has been used herein to encompass all of the above fluids and should not be construed or limited to any one particular embodiment. The air then travels through the exchanger 30 to the exchanger 40. Preferably, the air traverses a path 61 through the exchanger 30, adapted in a manner such that heat from the hotter, undried air entering the inlet 60 can be transferred to the cooler, dried air exiting an outlet 70. By way of example, air entering the inlet 60 may be 40 to 70 degrees Fahrenheit hotter than air exiting the outlet 70. Such a temperature differential can provide motive for significant heat transfer without the need for further mechanical intervention.

Once the air has traversed the exchanger 30, it enters the exchanger 40. The exchanger 40 is designed to draw heat from the incoming air to the refrigerant 11 supplied by the refrigerant system 10. In the embodiment shown, the refrigerant 11 cools the thermal jacket 50. Contents of the thermal jacket may comprise any material known and present in the art that can be cooled to a temperature at or lower than the dew point of the vapor (i.e., water) being condensed. Suitable materials include, but are not limited to, glycols and mixtures thereof.

In some embodiments, the thermal jacket 50 may comprise a phase change material (PCM). PCMs are heat storage media that can absorb or diffuse heat by changing from a solid to a liquid, or vice versa. In the instant invention, for example, as the phase change material absorbs heat from the undried air, it begins to change phase from a solid to a liquid. However, without being limited by or held to scientific theory, because of the constant temperature behavior of PCM technology, the thermal jacket 50 can maintain a constant temperature during the transition. The process can take minutes to hours depending on the PCM, ambient temperature of the air, and workload.

In some embodiments, PCMs that can absorb the greatest amount of heat over the smallest temperature range are preferred. In other words, PCMs that remain in the solid phase longer for a given amount of heat are desirable. Scientifically, the thermal conductivity of a fluid increases significantly when in a solid phase as opposed to a liquid. Water, for example, has a thermal conductivity of 0.326 BTU/hr-ft-° F. at 32° F., whereas ice has a thermal conductivity of 1.18 BTU/hr-ft-° F. at the same temperature. Because of their ability to absorb heat at both a solid state (high thermal conductivity) and a liquid state (lower thermal conductivity), PCMs can more rapidly and efficiently absorb the heat of condensation than materials that do not undergo a phase change. Therefore, much more heat can be stored in a much smaller volume of medium using the latent heat of freezing (solid→liquid) rather than the heat associated with changing temperatures, allowing for the development of much smaller heat exchangers.

During standard operation of one embodiment of the instant invention, the refrigerant 11 cools (or "charges") the thermal jacket 50 so that the PCM therein becomes solid, thereby allowing the thermal jacket 50 to draw heat from the incoming air 61. The heat from the incoming air 61 is transferred through the PCM/thermal jacket 50 to the heat absorbing refrigerant 11.

When the temperature or pressure of return refrigerant 12 reaches a pre-determined temperature or pressure, the refrigerant system 10 can shut off. The pre-determined temperature or pressure may be chosen to signal that no further cooling by the refrigerant system 10 is needed, for example, at times when the temperature or pressure of refrigerant 11 entering the thermal jacket 50 nears the temperature or pressure of the refrigerant 12 exiting the jacket 50.

During such periods of little to no load, when the compressor is deenergized, the PCM can continue to absorb heat from the undried air. In other words, the PCM can supply the necessary cooling by absorbing heat in the solid phase while maintaining a low constant temperature before changing to liquid. In such a manner, this invention can allow for the extension of time periods where the refrigerant system 10 may remain deenergized When the temperature of return refrigerant 12 or the thermal jacket 50 reaches a pre-determined temperature, the refrigerant system 10 can re-energize and the PCM can be relatively quickly recharged (i.e., solidified) by the refrigerant system 10. The net effect of this system is that the cycle periods can be extended and less energy can be consumed than convention refrigeration-type air dryers that do not use PCMs. The compressor cycling rate can be reduced from thirty or forty times per hour to, for example, less than six per hour.

Heat storage mediums can be developed to change state at a chosen temperature. For example, a medium can be of a composition to freeze at +4° C. that would preclude water freezing, or icing, in the exchanger 40. PCMs which change states between liquid and solid are manufactured by many companies, for example PCM Thermal Solutions of Naperville, Ill. The PCM A4 is an organic paraffin which freezes at +4° C. and is composed of a blend of heavy cut hydrocarbons. The types E7 and E8 that change state at +7° C. and +8° C., respectively, are composed of ammonia and sodium sulfate salts. For low dew point services, such as refrigeration systems with reversing regenerative heat exchangers, low temperature PCMs can be used including TEA-29 that freezes at −29° C. The TEA media are composed of inorganic hydrated salt solutions, such as calcium chloride in water.

Returning to FIG. 1, the cooled air 62 exiting the thermal jacket 50, should be cooled enough to initiate condensation of the water therein. The use of "water" herein is merely exemplary, and is intended to include any and all vaporous fluids that are chosen for condensation. The condensed water, then, is collected and removed in a condensate separator 80. Condensate separators are known in the art and any such separator may be used with the present invention.

As shown in FIG. 1, the return path for cooled air 62 may optionally be adapted in the exchanger 30 such that heat may be transferred from the incoming air 61 to the exiting air 62. In such a way, not only is the exiting air heated closer to the temperature of the air 61 as it enters the exchanger 20, but the air 61 entering the exchanger 20 is precooled before entering exchanger 40.

A conventional refrigeration system 10 is depicted in the embodiment of FIG. 1. Refrigerant gas 12 is pressurized by a compressor 13. The compressor 13 compresses the refrigerant gas 12. The compression process raises the refrigerant 12 pressure and also the temperature. In order to cool the temperature, the refrigerant 12 is channeled through a condenser 14, which is a heat exchanging means that allows the refrigerant 12 to dissipate the heat of pressurization. As it cools, the refrigerant gas 12 cools into a refrigerant liquid 11. The refrigerant 11 is then dried and/or filtered of contaminants by a filter/dryer means 15.

The liquid refrigerant 11 is then passed through an expansion device 16 which transfers the liquid refrigerant 11 from a high pressure zone to a low pressure zone, thereby vaporizing the refrigerant 11. In evaporating, the refrigerant 11 draws heat, preferably from the thermal jacket 50 and/or the undried air 61. Typically, refrigeration systems will also comprise a sensing bulb 17. The sensing bulb 17 is generally a temperature sensing device that can regulate the flow of the return refrigerant 12. Preferably, the sensing bulb 17 is able to compare the temperature of the cooled refrigerant 11 with the return refrigerant 12 and has the means to regulate the system 10 when a pre-determined superheat is reached.

Figure 2:
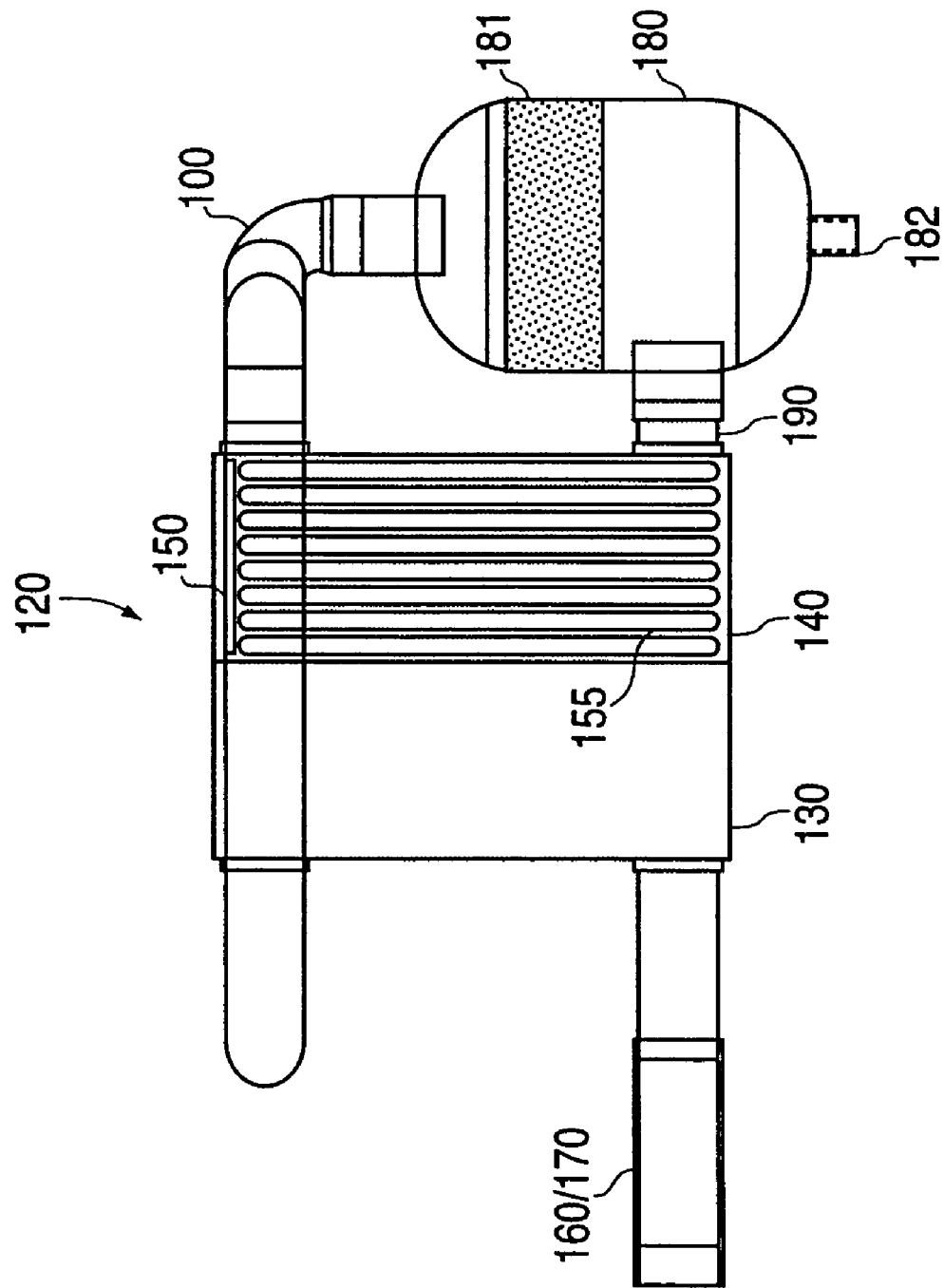
FIG. 2 is a cut-away of refrigeration chiller of a refrigerated air dryer in accordance with the present invention.

Shown in FIG. 2 is an embodiment of a heat exchanger 120 in accordance with the present invention. The heat exchanger 120 comprises an air/air heat exchanger 130, an air/refrigerant heat exchanger 140, and a condensate separator 180. The air/refrigerant exchanger 140 is known as a "brazed plate" heat exchanger and comprises a series of stacked plates. The plates may be comprised of any materials that are sturdy when pressurized, heated, and cooled, and can conduct heat efficiently. Preferably metal plates are used, and more specifically, stainless steel or copper plates.

A braised plate exchanger comprises alternating stainless steel and copper plates fused together creating "gaps" or "slits" between the plates. In some embodiments of the present invention, at least three such gaps are envisioned. A first of the gaps is utilized to contain an incoming flow of air to be dried. A second of the gaps can contain a refrigerant and a third one of the gaps may contain a PCM. Preferably, the refrigerant plate contacts the PCM plate which contacts the air plate, however, alternate combinations are also possible.

As shown in FIG. 2, an inlet pipe 160 may be attached to the air/air exchanger 130 evaporator to allow incoming air to flow into any chamber designated to hold incoming air. Preferably, as described above, the incoming air follows a course counter-flow to the outgoing air. This adaptation functions as an air/air heat exchange thereby pre-cooling the incoming air before it enters exchanger 140. The incoming air then moves through the braized plate heat exchanger 150.

The braized plate heat exchanger 150 comprises a series of stacked plates creating chambers therefrom. For the reasons mentioned above, the incoming air preferably traverses the heat exchanger 140 counter-flow to the refrigerant. A probe 155 may also be incorporated in the exchanger 150 to sense and/or report a status of the refrigerant and/or the PCM therein. Preferably, in some embodiments, the probe 155 is a phase change temperature sensing probe and is located at a location within exchanger 150 where the PCM would be warmest. However, probe 155 may be adapted for use in any location within heat exchanger 120. In any event, once having traversed the heat exchanger 140, the exiting air is cooled to permit condensation of the water.

A condensate separator 180 may be coupled to the exchanger 120 via an outlet port 190. The separator 180 separates the condensed water from the air stream. In some embodiments, a mesh 181 may be introduced into the separator 180 to aid condensation. The mesh 181 may comprise any material, preferably materials that will not rust or fail when wet, and need not be limited to any one particular design. Stainless steel wire meshes may be utilized in some embodiments. A drain 182 may be provided to allow the condensate to exit the separator 180.

Piping 100 may be coupled to the separator 180 to allow dried air to re-enter the exchanger 130, and exit through an outlet port 170. An air/air exchanger 130 is provided to allow the outgoing cool dry air to pre-cool incoming warm air.

Figure 3:
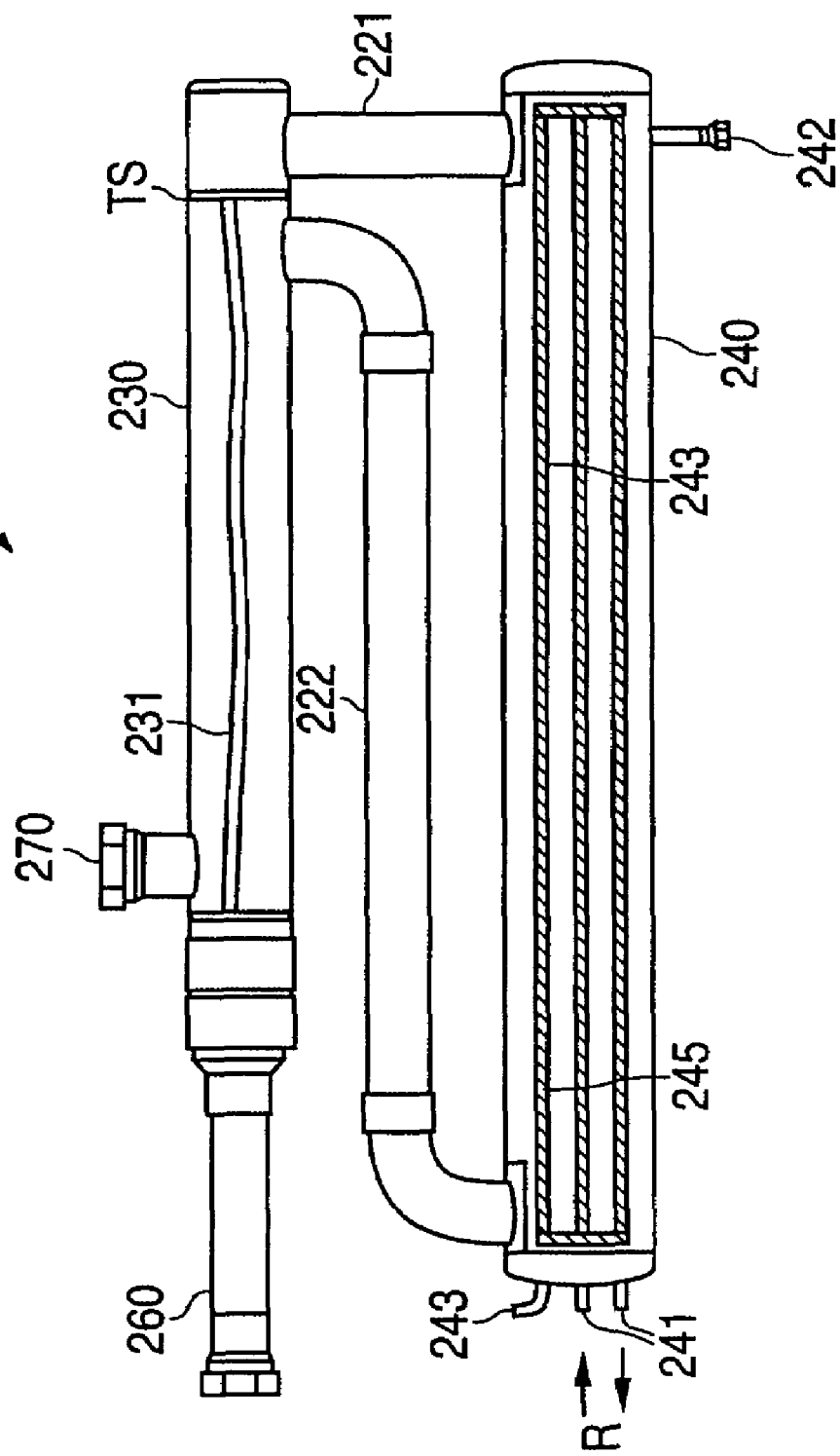
FIG. 3 is a cut-away of refrigeration chiller of a refrigerated air dryer in accordance with the present invention.

Shown in FIG. 3 is an embodiment of a heat exchanger 220 in accordance with the present invention. The heat exchanger 220 comprises an air/air heat exchanger 230, an air/refrigerant heat exchanger 240, and tubes 221 and 222 that permit that transfer of air between the exchangers 230 and 240.

In greater detail, the heat exchanger design of FIG. 3 comprises an inlet port 260 that receives an incoming flow of a fluid, for example, compressed air. The inlet 260 is coupled to tubing 231 within exchanger 230 that is adapted for air/air heat exchange between the warmer, undried air entering the exchanger 220 and the cooler, dried air exiting the exchanger 220. For example, air entering may be designed to flow through the tubes 231 through the center or periphery of exchanger 230, the sum of the tubes 231 being surrounded by cooler air exiting an outlet 270. As with the other embodiments described herein, preferably, the entering air and the exiting air are arranged in a counter-flow arrangement so as to maximize heat transfer. Such designs are commonly referred to as "shell-and-tube" or "multitube-in-tube" heat exchangers in the art.

Once the incoming air has traversed the air/air exchanger 230, it may move through a connecting tube 221 into the air/refrigerant exchanger 240. The exchanger 240 can be constructed with three concentric tubes such that the refrigerant flows through the inner-most tube, a PCM is retained between the first and second tube, and the air passes through the annular space between the third and second tubes. The triple tube design can be constructed in a coiled manner, or it can be designed as a straight tube construction as shown. Refrigerant is circulated through the exchanger 240 through inlet/outlet ports 241. The refrigerant, in turn, cools a jacket 245 containing the PCM and/or the undried air traversing the exchanger 240.

As heat is drawn from the incoming air to the refrigerant and/or the PCM, the air is cooled to or below its dew point and moisture (e.g., water) begins to condense. The condensed water is collected within the exchanger 240 and can be drained from the system though a condensate drain 242. The exchanger 240 may also include a fluid fill/vent 243. The fill/vent 243 may be adapted to allow filling or refilling of PCM as is required, and also allow for venting of gases or heat contained therein.

Preferably, in some embodiments, a probe 243 is incorporated into the air/refrigerant exchanger 240. Preferably, the probe 243 is a phase change temperature sensing probe and is located at a location within the exchanger 240 where the PCM would be warmest. However, the probe 243 may be adapted for use in any location within heat exchanger 120. The probe 243 may also signal shut-off or operation of the refrigerant system in some embodiments.

In the embodiment shown in FIG. 3, once dried, the cooled air may be directed by another connecting tube 222 back to the exchanger 230. In the arrangement shown, the cooled air is fed counter-flow to the incoming air in tubes 231 within the exchanger 230. This process not only cools air within the tubes 231, but also warms the dried air exiting the exchanger 220 though the outlet 270.

Figure 4:
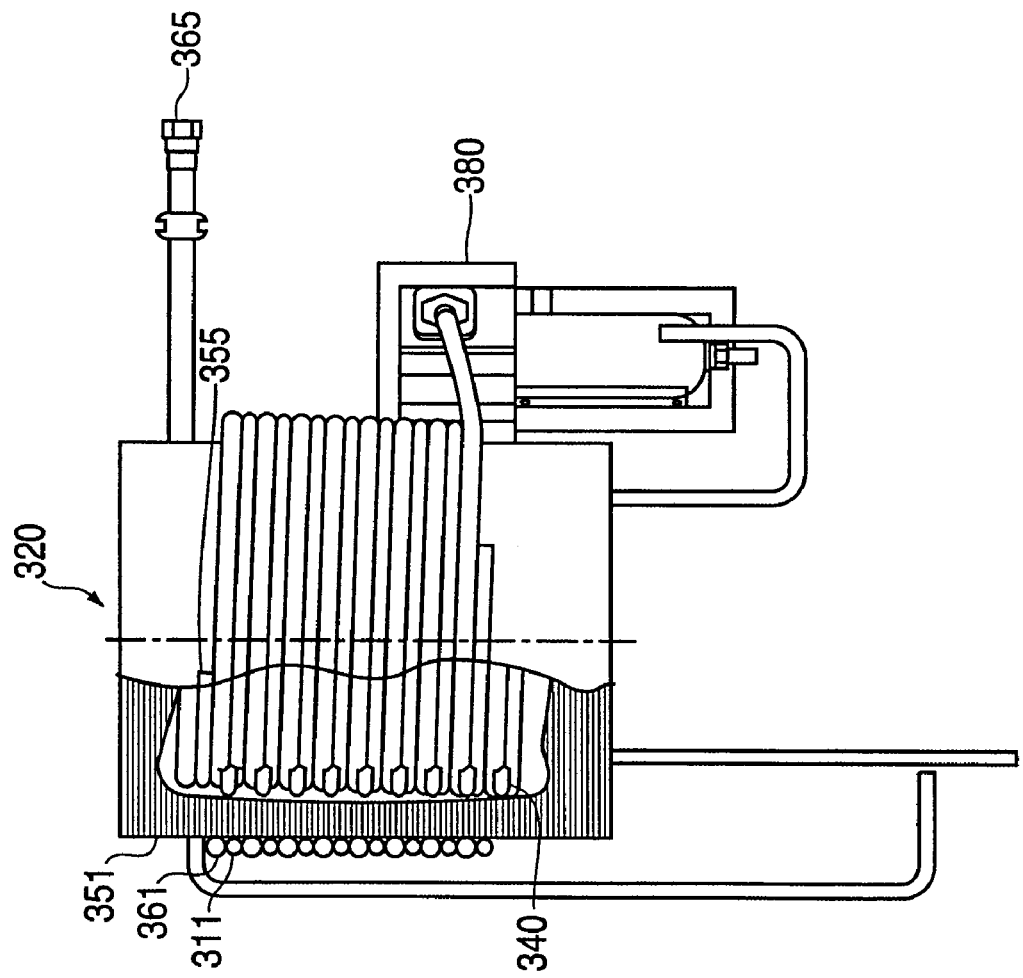
FIG. 4 is cut-away of refrigeration chiller of a refrigerated air dryer in accordance with the present invention. in accordance with the present invention.

FIG. 4 depicts a heat exchanger 320. The heat exchanger 320 comprises an air/refrigerant exchanger 340 and a separator 380, and may optionally include an air/air exchanger as well. The exchanger 340 can be constructed with three coined tubes bundled together as illustrated in the figure. One of the three tubes 361 passes the air as it enters the exchanger 320 and exits drier. The air may enter/exit the exchanger 320 via an inlet/outlet 365 which can comprise a tube within a tube design.

In addition, there are at least two other tubes 311 and 351 positioned/nested around the air tube 361. One of the other tubes, 351, contains a PCM, and the other of the two tubes, 311, contains a refrigerant. In the preferred embodiment of the present invention, the tubes 311, 351, and 361 are made from copper, and all three tubing lines are positioned such that one line of tubing does not overlap another line of material.

However, it should be understood by one of ordinary skill in the art that the three lines of tubing may all be made from any other material, or each of the three lines of tubing may be made from different materials. It should also be understood by one of ordinary skill in the art that the positioning of the three lines of tubing may also vary.

The exchanger 320 embodied in FIG. 4 additionally comprises a separator 380 to mechanically separate the condensed moisture from the dried air. A probe 355 may also be installed in the exchanger 320 as indicated in the embodiments above.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heat exchanger, comprising:
   an air/air heat exchanger;
   a thermal jacket;
   an air/refrigerant heat exchanger coupled to said air/air heat exchanger, said air/refrigerant heat exchanger comprising a plurality of tubes disposed within said thermal jacket; and
   a phase change material to store heat transfer capacity for the air/refrigerant heat exchanger, the phase change material being disposed between a first tube of said plurality of tubes and a second tube of said plurality of tubes, the phase change material being thermally isolated from the air/air heat exchanger by the thermal jacket.

2. The heat exchanger of claim 1, wherein said phase change material is contained within the thermal jacket.

3. The heat exchanger of claim 1, wherein said plurality of tubes are arranged in a coiled manner.

4. The heat exchanger of claim 1, wherein said plurality of tubes are arranged in a straight manner.

5. The heat exchanger of claim 1 further comprising a probe for sensing a temperature.

6. The heat exchanger of claim 5, wherein said probe is a phase change temperature sensing probe, and is located near said phase change material.

7. A heat exchanging apparatus, comprising:
   an air/air heat exchanging means;
   an air/refrigerant heat exchanging means coupled to said air/air heat exchanging means, said air/refrigerant heat exchanging means comprising a plurality of means for conveying; and
   a phase changing means to store heat transfer capacity for the air/refrigerant heat exchanging means, the phase changing means being disposed between a first means for conveying of said plurality of means for conveying and a second means for conveying of said plurality of means for conveying; and
   a thermal insulating means disposed between said air/air heat exchanging means and said air/refrigerant heat exchanging means to thermally isolate said air/air heat exchanging means from said air/refrigerant heat exchanging means.

8. The heat exchanging apparatus of claim 7, wherein said phase changing means is contained within said thermal insulating means.

9. The heat exchanging apparatus of claim 7, wherein said plurality of means for conveying are arranged in a coiled manner.

10. The heat exchanging apparatus of claim 7, wherein said plurality of means for conveying are arranged in a straight manner.

11. The heat exchanging apparatus of claim 7, further comprising a sensing means to sense a temperature.

12. The heat exchanging apparatus of claim 11, wherein said sensing means is a phase change temperature sensing means, and is located near said phase changing means.

13. A heat exchanging apparatus, comprising:
   a first exchanging means for conducting heat from a first stream of air to a second stream of air;
   a second exchanging means for conducting heat from the first stream of air to a stream of fluid, said second exchanging means comprising a first conveying means and a second conveying means;
   a coupling means to couple the first exchanging means to the second exchanging means; and
   a phase changing means to store heat transfer capacity for the second exchanging means, the phase changing means being disposed between said first conveying means and said second conveying means; and
   a thermal insulating means to thermally isolate said first exchanging means from said second exchanging means.

\* \* \* \* \*

UNITED STATES PATENT AND TRADEMARK OFFICE
CERTIFICATE OF CORRECTION

PATENT NO. : 7,721,787 B2
APPLICATION NO. : 11/598042
DATED : May 25, 2010
INVENTOR(S) : James W. Barnwell It is certified that error appears in the above-identified patent and that said Letters Patent is hereby corrected as shown below:

Title Page please insert item (62) --Related U.S. Application Data: Division of U.S. Application No. 10/670,213, filed on September 26, 2003, now U.S. Patent No. 7,134,483--;

Column 1, line 4, Field Of The Invention, before "the present invention", please insert --This application claims priority to and is a divisional of a U.S. patent application entitled, "REFRIGERATION-TYPE DRYER APPARATUS AND METHOD," filed September 26, 2003, having a Serial Number 10/670,213, now patented as U.S. Patent No. 7,134,483, issued November 14, 2006, the disclosure of which is hereby incorporated by reference in its entirety--.

Signed and Sealed this

Sixth Day of July, 2010

David J. Kappos
*Director of the United States Patent and Trademark Office*